(12) United States Patent
Bierwirth et al.

(10) Patent No.: US 9,487,183 B2
(45) Date of Patent: Nov. 8, 2016

(54) GAS GENERATOR

(75) Inventors: Sebastian Bierwirth, Rechtmehring (DE); Fabien Cristoforetti, Dreux (FR); Dieter Spitzenberger, Kraiburg am Inn (DE)

(73) Assignee: TRW Airbag Systems GmbH (DE)

( * ) Notice: Subject to any disclaimer, the term of this patent is extended or adjusted under 35 U.S.C. 154(b) by 0 days.

(21) Appl. No.: 13/129,442

(22) PCT Filed: Nov. 26, 2009

(86) PCT No.: PCT/EP2009/008422
§ 371 (c)(1),
(2), (4) Date: May 16, 2011

(87) PCT Pub. No.: WO2010/063404
PCT Pub. Date: Jun. 10, 2010

(65) Prior Publication Data
US 2011/0221176 A1    Sep. 15, 2011

(30) Foreign Application Priority Data

Dec. 3, 2008  (DE) .................. 10 2008 060 305

(51) Int. Cl.
  *B60R 21/263*  (2011.01)
  *B60R 21/264*  (2006.01)
(52) U.S. Cl.
  CPC .......... *B60R 21/2644* (2013.01); *B60R 21/263* (2013.01); *B60R 2021/2648* (2013.01)
(58) Field of Classification Search
  CPC ............ B60R 21/2644; B60R 21/263; B60R 21/2648
  USPC ................................................. 280/736, 741
  See application file for complete search history.

(56) References Cited

U.S. PATENT DOCUMENTS

| 6,095,558 | A | 8/2000 | Bayer et al. |
| 6,709,012 | B1 * | 3/2004 | Tanaka et al. ................ 280/736 |
| 6,899,351 | B2 * | 5/2005 | Saso et al. .................... 280/736 |
| 7,267,365 | B2 * | 9/2007 | Quioc ........................... 280/736 |
| 7,401,810 | B2 * | 7/2008 | Brisighella et al. .......... 280/741 |
| 7,744,124 | B2 * | 6/2010 | Yamazaki ..................... 280/736 |
| 7,883,111 | B2 * | 2/2011 | Blessing et al. ............. 280/741 |
| 8,083,256 | B2 * | 12/2011 | Yamazaki .................... 280/736 |
| 2001/0001523 | A1 | 5/2001 | Green, Jr. et al. |
| 2003/0184068 | A1 * | 10/2003 | Nakashima et al. ......... 280/741 |
| 2006/0131853 | A1 * | 6/2006 | Iwai et al. .................... 280/736 |

(Continued)

FOREIGN PATENT DOCUMENTS

| DE | 19505580 | 8/1996 |
| DE | 19506687 | 8/1996 |

(Continued)

*Primary Examiner* — Drew Brown
(74) *Attorney, Agent, or Firm* — Tarolli, Sundheim Covell & Tummino LLP (57) ABSTRACT

A gas generator (10) comprises an outer housing, which has at least two housing parts (12), which are connected to each other, in the form of a diffuser bowl (14) with outflow openings (16) towards the outside and a cover (20) directly connected to the diffuser bowl (14). Inside the gas generator (10), at least one first and one second combustion chamber (30, 36) are provided, wherein the first combustion chamber (30) is delimited by an inner wall (32) and the second combustion chamber (36) is located within the space delimited by the diffuser bowl (14) and the cover (20). The diffuser bowl (14) and/or the cover (20) comprise a section (24) that is shaped, in particular deep-drawn, into an indentation, forming at least partially a circumferential section of the inner wall (32).

29 Claims, 4 Drawing Sheets

(56) References Cited

U.S. PATENT DOCUMENTS

| | | |
|---|---|---|
| 2007/0001439 A1 | 1/2007 | Matsuda et al. |
| 2007/0120349 A1 | 5/2007 | Hoffman et al. |
| 2008/0136152 A1 | 6/2008 | McFarland |

FOREIGN PATENT DOCUMENTS

| | | |
|---|---|---|
| DE | 19620758 | 11/1997 |
| DE | 69719520 | 6/1999 |
| DE | 602005000573 | 11/2007 |
| DE | 102007054344 | 6/2008 |
| EP | 1205363 | 5/2002 |
| EP | 1293394 | 3/2003 |
| EP | 1669258 | 6/2006 |
| JP | 4345555 | 12/1992 |
| JP | 2004196116 | 7/2004 |
| WO | 01/47752 | 7/2001 |

\* cited by examiner

Fig. 6

GAS GENERATOR

RELATED APPLICATIONS

This application corresponds to PCT/EP2009/008422, filed Nov. 26, 2009, which claims the benefit of German Application No. 10 2008 060 305.8, filed Dec. 3, 2008, the subject matter, of which is incorporated herein by reference in their entirety.

BACKGROUND OF THE INVENTION

The invention relates to a multi-stage inflator, especially for a vehicle occupant restraint system in motor vehicles.

From the state of the art multi-stage inflators comprising an outer housing are known which includes substantially two housing shells connected to each other and defining an interior which forms, inter alia, a main combustion chamber. In the main combustion chamber plural sleeve-shaped components are provided which may be in the form of separate additional combustion chambers. The plurality of components such as e.g. the separate combustion chamber elements, igniter sleeves and igniter carriers, render the assembly complicated and thus expensive. The use of housing shells permits simple and inexpensive manufacture and assembly as well as a light-weight design of the outer housing. The outer housing must be extremely loadable when the inflator is ignited.

SUMMARY OF THE INVENTION

It is the object of the invention to provide a multi-stage inflator having a reinforced mechanical structure and a simplified and thus inexpensive design.

This object is achieved by an inflator according to the invention comprising an outer housing which includes at least two housing parts connected to each other in the form of a diffuser bowl with outflow openings toward the outside and a cover directly connected to the diffuser bowl. Inside the inflator at least a first and a second combustion chamber are provided, wherein the first combustion chamber is confined by an inner wall and the second combustion chamber is located within the space confined by the diffuser bowl and the cover. The diffuser bowl and/or the cover include a section that is reshaped, in particular deep-drawn, into an indentation forming at least partially a circumferential section of the inner wall. Since the inner wall confining the first combustion chamber is formed by the diffuser bowl and/or the cover, a separate sleeve-shaped component part can be saved inside the inflator.

Preferably the first combustion chamber is surrounded at least in sections, preferably completely, at least in the area of the circumferential wall of the first combustion chamber by the second combustion chamber.

In accordance with a preferred embodiment, the housing parts are shaped so that they are connected to each other along an outer closed curve and along an inner closed curve, wherein the second combustion chamber is formed between the outer and the inner closed curve. In this way it is possible, inter alia, that the second combustion chamber can have an annular shape and is confined by the two housing parts both at the outer and at the inner circumference.

At least one, preferably both curves can have a circular shape. In this way the geometry of the inflator is simplified.

It is possible that the inner wall is mounted directly at the bottom of the opposed housing part. In this manner, a tie rod is realized by the direct connection of the housing parts. Thus a separate element forming a tie rod can be saved and only one connecting point is required for the tie rod.

Preferably the inner wall is mounted directly at the bottom of the opposed housing part at the inner curve. In this way the tie rod is combined with the design of the second combustion chamber.

The housing parts are preferably interconnected by welding, the welds being located especially on the curves.

The indentation formed by reshaping and the first combustion chamber formed in this way is closed, for instance, by a closing member, the first closing member preferably forming a third housing part. This permits an independent closing of the first combustion chamber.

The closing member preferably comprises one or more outflow openings for the first combustion chamber, the one or more outflow opening(s) being directed especially towards the outer area and/or the inner area of the inflator. In this way separate outflow openings for the first combustion chamber can be provided.

Especially the housing part provided with the indentation has a bottom outside the indentation and the closing member is connected to the bottom and/or the outflow opening in the closing member is located substantially level with the bottom. In this way a substantially uniform shape of the inflator is resulting without very distinct indentation or projections in the area of the closing member.

The first and second combustion chamber can be associated with respective separate outflow openings, especially towards the outside. This permits an independent ignition of the two combustion chambers.

The outer housing preferably includes an axial central axis and the outflow openings of the first combustion chamber are located more closely to the central axis by at least the factor 2 than those of the second combustion chamber. In this way the outflow openings of the different combustion chambers are spatially separated from each other, thereby reducing the loads onto the component parts adjacent to the inflator.

The outer housing can have an axial central axis and the first combustion chamber can be arranged symmetrically with respect to the central axis. In this way loads onto the inflator housing are distributed symmetrically.

In accordance with another embodiment, the outer housing includes an axial central axis and the first combustion chamber is arranged eccentrically with respect to the central axis. This is resulting, in the second combustion chamber on the side of the central axis opposed to the first combustion chamber, in an enlarged volume which may serve, for instance, for attaching an igniter device.

Preferably the cover has a bowl shape. This permits a simple mode of manufacture, for instance by deep-drawing a sheet metal.

In accordance with a preferred embodiment, the housing part provided with the indentation has a bowl shape. The indentation extends into the interior of the bowl.

Advantageously the indentation can be formed in the bowl shape by deep-drawing in two directions.

The invention moreover relates to an inflator comprising an outer housing which has at least two housing parts connected to each other in the form of a diffuser bowl with outflow openings and a cover directly connected to the diffuser bowl. Inside the inflator at least two combustion chambers are provided with which separate igniting devices situated in openings of the outer housing are associated. At least one of the igniting devices is mounted to either of the two housing parts by a surrounding plastic injection molding. The fact that the igniting devices are mounted directly to either of the housing parts can save a separate support for the igniting devices.

In accordance with a preferred embodiment, the surrounding plastic injection moldings of the igniting devices are separated from each other. This also permits separate mounting of the igniting devices.

In accordance with another embodiment, the plastic injection moldings of the igniting devices are interconnected. Thus the igniting devices can be mounted to the inflator during a joint processing step.

Preferably, igniter plug receptacles exhibiting different geometries are formed in the plastic injection moldings. In this way, the different igniter plug receptacles can be prevented from being confused.

The housing part can have at least one recess in the area of the igniting devices arranged at the outer housing, wherein contact pins of the igniting device extend preferably in the direction of the recess or in the opposite direction. Preferably the free ends of the contact pins are located within the recess. The contact pins are thus protected from mechanical influence because the contact pins do not project from the recess into the open.

According to a preferred embodiment, the recess is lined at least partially by the plastic injection molding.

An igniting device associated with the second combustion chamber can be arranged in a separated area of the first combustion chamber. In this way, both igniting devices can be arranged in the first combustion chamber, which is advantageous especially in a symmetric arrangement of the first combustion chamber.

Preferably the first combustion chamber is subdivided into two areas independent of each other, separate outflow openings being associated with each area. This permits an independent ignition of the combustion chamber areas independent of each other and a different outflow path for the gas generated in the combustion chamber area is permitted for each combustion chamber area.

The invention also relates to an inflator, especially in accordance with the afore-described type, in which all outflow openings of a first combustion chamber are disposed in the outer housing such that they are located on one side of a first plane including an axial central axis of the outer housing. This permits spatial separation of the outflow openings of the first combustion chamber.

The outflow openings arranged in the outer housing of the first combustion chamber are preferably located in a sector which is formed by the first plane and a further second plane including the axial central axis, the sector having especially an angle of less than or equal to 180°, preferably less than or equal to 135°, especially less than or equal to 90°.

Outflow openings of the second combustion chamber are arranged, for instance, on a third plane substantially located perpendicularly to the axial central axis.

The outflow openings of the first combustion chamber are preferably arranged on a fourth plane arranged substantially in parallel to the third plane including the outflow openings of the second combustion chamber.

The distance between the third plane and the fourth plane can be more than 7 mm, preferably between 7 and 25 mm, further preferably between 11 and 21 mm. In this manner, a spatial separation is possible in axial direction of the discharge openings arranged in the third and fourth planes.

Moreover, the invention relates to an inflator, especially as described in the foregoing, comprising an outer housing which has at least two housing parts connected to each other in the form of a diffuser bowl with outflow openings and a cover directly connected to the diffuser bowl, wherein inside the inflator at least a first and a second combustion chamber are provided and the second combustion chamber is located within the space confined by the diffuser bowl and the cover. The diffuser bowl forms a partition wall between the first and second combustion chambers. In this way a separate partition wall between the first and second combustion chambers can be saved.

Finally, the invention relates to an inflator, especially as described in the foregoing, comprising an outer housing which has at least two, preferably exactly two housing parts connected to each other along a circumferential line in the form of a diffuser bowl with outflow openings to the outside and a cover directly connected to the diffuser bowl. Inside the inflator at least two combustion chambers are provided which are associated with separate igniting devices. The diffuser bowl and the cover separate the two combustion chambers from each other by at least one common contact area spaced apart from the circumferential line.

A module according to the invention comprises an inflator according to the invention, an airbag inflatable by the inflator and a mounting means for attaching the module, especially in the interior of a vehicle.

The previously described second combustion chamber can be understood as main combustion chamber of the inflator which can be ignited as the first one of the two combustion chambers. Staggered in time, the previously described first combustion chamber can then be ignited. The two combustion chambers can just as well be ignited in the inverse order. Equally, both combustion chambers can be simultaneously ignited. Depending on the requirements of the vehicle occupant restraint system, the igniting times of the two combustion chambers can be adjusted to each other.

BRIEF DESCRIPTION OF THE DRAWINGS

Further features and advantages of the invention are resulting from the following description and from the following drawings that are referred to, in which.

DESCRIPTION OF EXEMPLARY EMBODIMENTS

Figure 1:
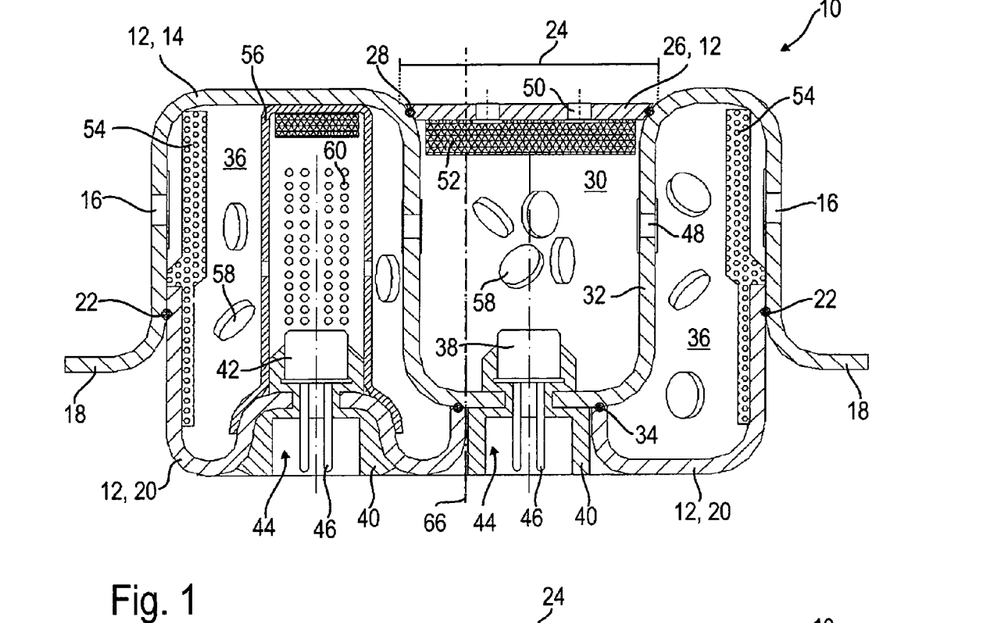
FIG. 1 shows a section across an inflator according to a first embodiment of the invention.

FIG. 1 illustrates a first embodiment of an inflator 10 comprising an outer housing which has plural housing parts 12 connected to each other.

A first housing part is a diffuser bowl 14 with outflow openings 16 towards the outside and a flange 18 which serves for mounting the inflator 10 in an airbag module of a vehicle occupant restraint system. A second housing part 12 is a bowl-shaped cover 20 which at its outer circumference is connected by welding to the diffuser bowl 14 along an outer closed curve 22, the weld being located on the curve 22. The cover 20 and the curve 22 have a circular shape.

The diffuser bowl 14 has a section 24 which is re-formed into an indentation extending into the interior of the inflator. The indentation is closed by a closing member 26 substantially level with the bottom of the diffuser bowl 14 partly forming the end face of the inflator 10, wherein the closing member 26 constitutes a third housing part 12. The closing member 26 is adjacent to the bottom of the diffuser bowl 14 and is connected to the diffuser bowl via a connecting point 28, e.g. by welding.

The indentation in the diffuser bowl 14 and the closing member 26 define a cavity that forms a first, especially inner, combustion chamber 30. The first combustion chamber 30 is confined by an inner wall 32 formed by the diffuser bowl 14 in the section 24 of the indentation. The inner wall 32 extends to the opposite cover 20 and is mounted directly at the bottom of the cover 20 along an inner closed curve 34.

The curve 34 along which the inner wall 32 is mounted at the bottom of the cover 20 is preferably circular and constitutes a contact area between the diffuser bowl 14 and the cover 20. Also other, even interrupted, curved and/or segmented geometries, point or line contact areas are imaginable. A tie rod enhancing the stability of the outer housing of the inflator is formed by mounting the inner wall at the bottom of the opposite housing part 12.

A first igniting device 38 is arranged in the first combustion chamber 30 and extends through an opening of the diffuser bowl 14 and the cover 20. The first igniting device is preferably fastened to the diffuser bowl 14 by a plastic injection molding 40. As an alternative, also for all other described igniting devices, a glass-metal seal can be provided as well.

A second combustion chamber 36 is located within the annular space confined by the diffuser bowl 14 and the cover 20. The inner wall 32 forms a partition wall between the first and second combustion chambers 30, 36 and is an integral part of the diffuser bowl 14.

A second igniting device 42 is associated with the second combustion chamber 36 and extends through an opening in the cover 20, wherein it is fastened to the cover 20 by a further plastic extrusion molding 40.

In the respective area of the igniting devices 38, 42 the cover 20 exhibits a recess 44 into which the contact pins 46 of the igniting devices 38, 42 extend, wherein the free ends of the contact pins 46 are located within the recess and thus are protected from mechanical loads. The recesses 44 are lined at least partially by the plastic extrusion moldings 40.

In order to prevent the connections of the two igniting devices 38, 42 from being confused, the plastic extrusion moldings 40 are in the form of igniter plug receptacles having different geometries. In this way, an igniter plug is prevented from being connected to the wrong igniting device 38, 42. Equally a third one and further connections, e.g. a ground connection, can be provided. This is applicable to all described igniting devices.

The first combustion chamber 30 includes first outflow openings 48 extending in radial direction through the inner wall 32 and constituting a connection of the first combustion chamber 30 to the second combustion chamber 36. Furthermore, the first combustion chamber 30 includes second outflow openings 50 extending in axial direction through the closing member 26 and pointing to the outside.

It is possible, as a matter of course, that the first combustion chamber 30 has outflow openings 48 only in the inner wall 32 or has outflow openings 50 only in the closing member 26.

A first filter element 52 is arranged at the front face and ahead of the outflow openings 50 provided in the closing member 26 and a second filter element 54 is arranged in the second combustion chamber 36 ahead of the outflow openings 16. The filter elements 52, 54 serve for cooling the exiting gas and prevent hot particles from exiting the outer housing of the inflator 10.

The first combustion chamber 30 is preferably arranged asymmetrically in the inflator 10 and eccentrically with respect to a central axis 66 of the inflator 10. By the eccentric arrangement of the first combustion chamber 30, at the right side of the inflator 10 in the shown embodiment, an enlarged volume which is used to arrange the second igniting device 42 is resulting on the opposite side of the second combustion chamber 36.

An igniting sleeve 56 is disposed within the second combustion chamber 36 above the igniting device 42 and serves for obtaining a homogenous ignition in the second combustion chamber 36.

The first and second combustion chambers 30, 36 are filled with a first fuel 58, wherein the nature (chemical composition and/or geometric shape) of the fuel 58 in the respective chambers can be either different or identical. A second fuel 60 is provided within the igniting sleeve 56.

Figure 2:
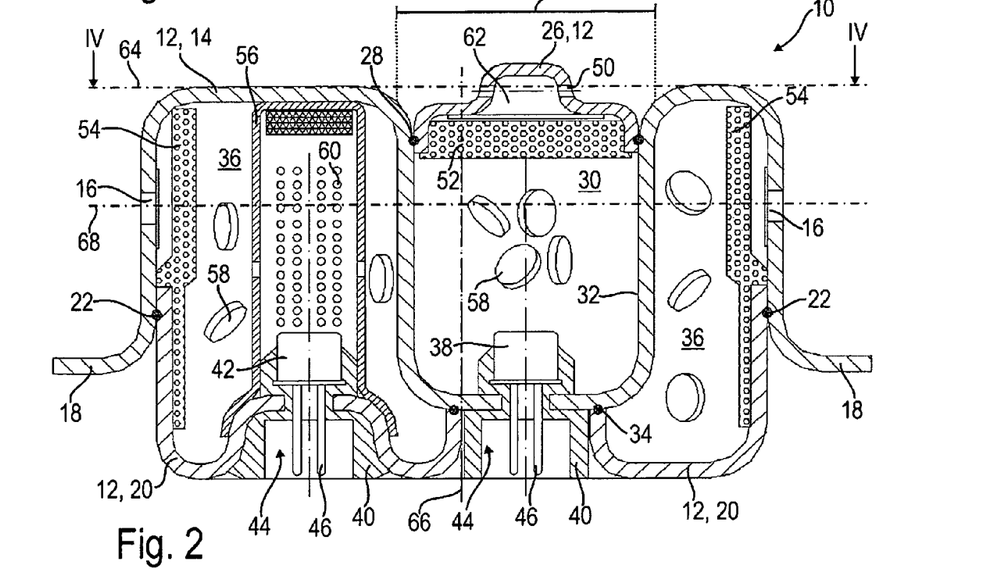
FIG. 2 shows a section across an inflator according to a second embodiment of the invention having a dome-shaped closing member.
Figure 3:
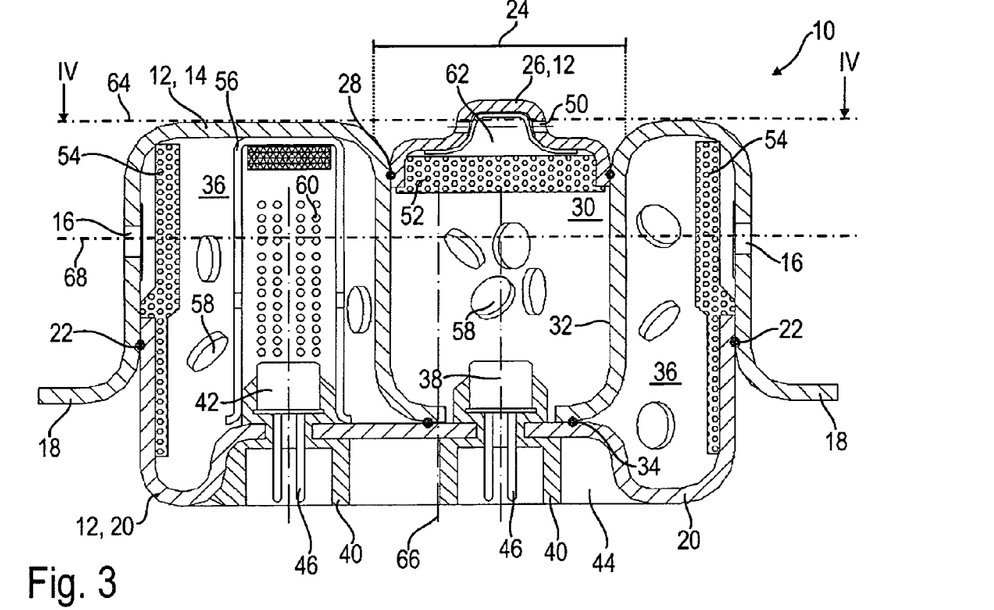
FIG. 3 shows a section across an inflator according to a third embodiment of the invention having a single recess in the cover.
Figure 4:
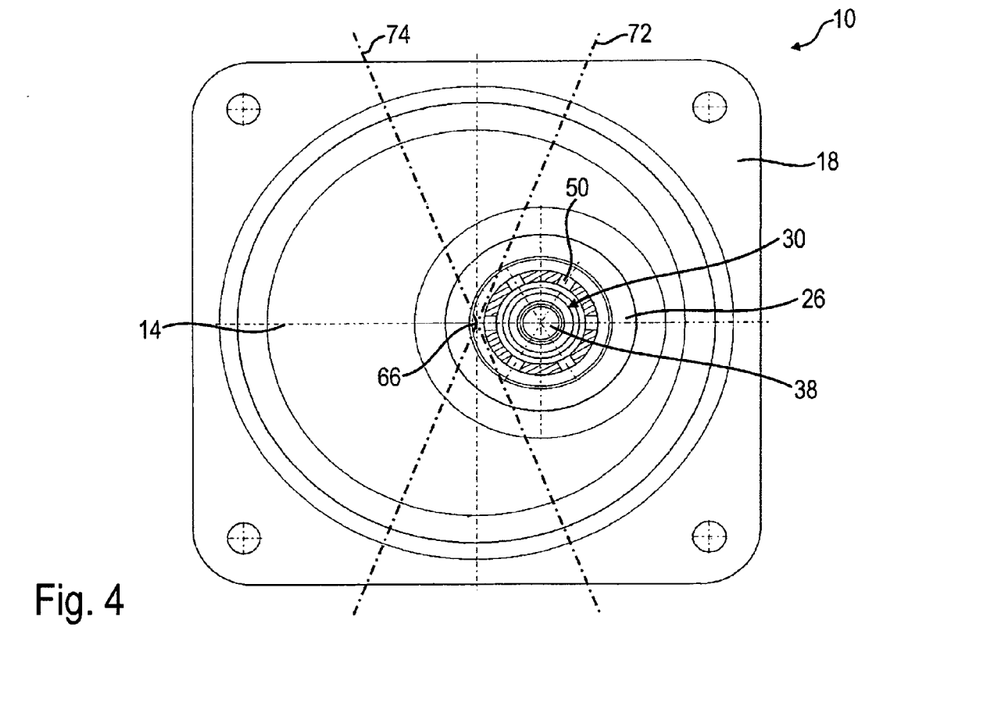
FIG. 4 shows a section across the plane IV-IV of an inflator according to FIG. 2 or FIG. 3.

The FIGS. 2 to 4 define first and second planes 72, 74 (cf. FIG. 4) including an axial central axis 66 of the outer housing of the inflator 10 as well as third and fourth planes 68, 64 (cf. FIGS. 2 and 3) located substantially perpendicularly to the axial central axis 66.

FIG. 2 illustrates a second embodiment of the invention. The second embodiment is largely analogous to the embodiment illustrated in FIG. 1, with corresponding parts being marked by equal reference numerals. The second embodiment differs from the first embodiment by a modified closing member 26 and modified outflow openings 50. Moreover, no outflow openings 48 are provided in the inner wall 32 of the first combustion chamber.

The closing member 26 is L-shaped, wherein in a first area of the dome the first filter element 52 is arranged and in a second area of the dome a cavity 62 is provided. From the cavity 62 outflow openings 50 extend through the closing member 26 in radial direction. The outflow openings 50 in the closing member 26 are substantially level with the bottom of the diffuser bowl 14 in a fourth plane 64 located substantially perpendicularly to the axial central axis 66. The outflow openings 16 of the second combustion chamber 36 are arranged in a third plane 68 located substantially perpendicularly to the axial central axis and being arranged substantially in parallel to the fourth plane 64. The planes 64, 68 are spaced apart from each other, the distance between the planes being more than 7 mm or between 7 mm and 25 mm or between 11 mm and 21 mm.

FIG. 3 shows a third embodiment of the invention which is largely analogous to the embodiment shown in FIG. 2, with corresponding parts being marked by the same reference numerals. The third embodiment has a cover 20 in which the first and second igniting devices 38, 42 are arranged in a joint recess 44. The plastic extrusion moldings 40 of the igniting devices 38, 42 are separated from each other in the shown embodiment. It is also possible, as a matter of course, that the plastic extrusion moldings of the two igniting devices 38, 42 are interconnected.

The first igniting device 38 is fastened to the cover 20 by the plastic extrusion molding 40 in contrast to the aforedescribed embodiments.

FIG. 4 shows a section across the inflator 10 (a top view onto the section across the plane IV-IV) according to the FIG. 2 or 3. The first filter element 52 is removed in the view, whereby one can have a look into the first combustion chamber 30, especially onto the first igniting device 38. The first combustion chamber 30 and thus the closing member 26 are arranged eccentrically on the right side of the central axis 66. All outflow openings 50 are located in a sector which is formed by the planes 72, 74 shown in dash-dot lines, the sector having an angle of 135°. It is also possible that the sector has an angle of less than or equal to 180°, less than 135° or less than or equal to 90°. With an angle of 180° the planes 72, 74 coincide and all outflow openings 50 are located on one side of the plane. The outflow openings 50 of the first combustion chamber 36 are moreover closer to the central axis 66 by at least a factor 2 than the outflow openings 16 of the second combustion chamber 36 (cf. FIG. 2 or 3).

The spatial separation of the outflow openings 16, 50 by a different distance from the central axis 66, the arrangement in different sectors of the inflator housing or the spacing of the planes 64, 68 in which the outflow openings 16, 50 are disposed reduces the load of the component parts of the airbag module adjacent to the inflator 10, especially of the airbag.

Figure 5:
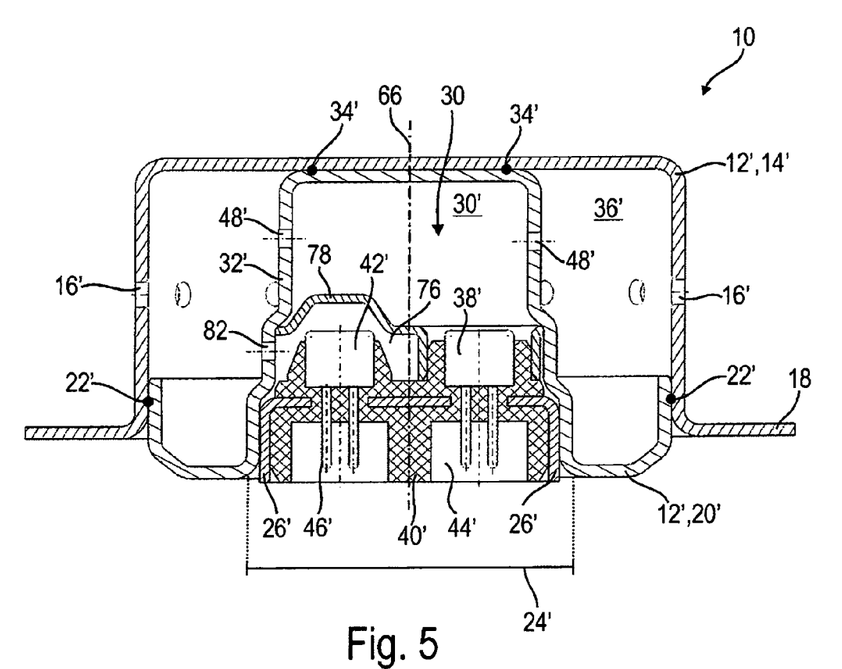
FIG. 5 shows a section across an inflator according to a fourth embodiment of the invention.

FIG. 5 illustrates a fourth embodiment of the invention in which a section 24' in the cover 20' is re-formed into an indentation. In this case, too, corresponding parts again have equal reference numerals. The indentation is closed by a closing member 26' connected to the bottom of the cover 20'. A first igniting device 38' and a second igniting device 42' are mounted to the closing member 26' by a, preferably joint, plastic injection molding 40'. The plastic extrusion molding 40' bundles two igniter plug receptacles including contact pins 46' which are located in a recess 44' of the closing member 26' and are configured analogously to the afore-described embodiments. Also separate plastic injection moldings of the at least two igniters are possible.

The cover 20' forms in the section 24' an inner wall 32' preferably arranged symmetrically about a central axis 66' of the inflator 10'. The inner wall 32' extends to the bottom of the opposite diffuser bowl 14' and is directly fastened there, preferably along an inner closed curve 34'. Inside the indentation a cavity forming a first combustion chamber 30 is defined by the closing member 26'.

An area 76 is separated from the first combustion chamber 30 by a separating element 78. The second igniting device 42' is arranged in said separated area 76. Respective separate outflow openings 82 are associated with the separated area 76 which connect the separated area 76 to a preferably annular second combustion chamber 36'.

The inner wall 32' forms a partition wall between the first combustion chamber 30 and the second combustion chamber 36' in which outflow openings 48' are arranged so as to interconnect the two combustion chambers 30, 36'. The first combustion chamber 30 is thus divided into two areas 76, 30' independent of each other, wherein different outflow openings 82, 48' are associated with each area. The diffuser bowl 14' includes outflow openings 16' towards the outside.

Further component parts of the inflator 10' such as e.g. fuel tablets, filter elements or combustion chamber closing elements are not shown in FIG. 5.

Figure 6:
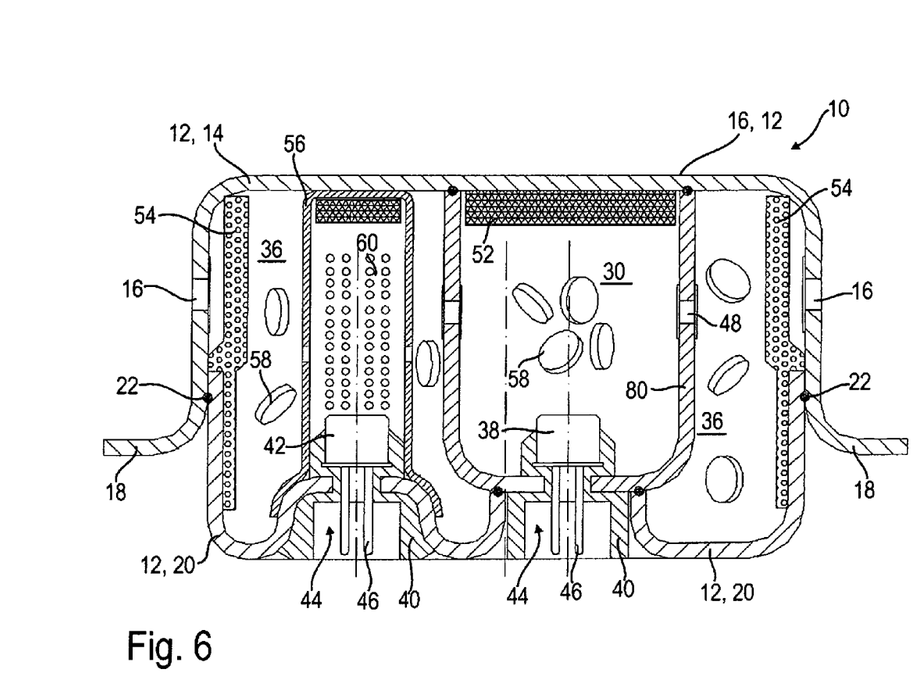
FIG. 6 shows a section across an inflator according to a fifth embodiment of the invention.

FIG. 6 illustrates a fifth embodiment of the invention in which an inflator 10 comprises a separate combustion chamber wall element 80 which is connected on one side to the diffuser bowl 14 and on its other side to the cover 20. The first igniting device 38 is mounted to the combustion chamber wall element 80 via a plastic injection molding 40 and a second igniting device is mounted to the cover 20 via a plastic injection molding 40. A first combustion chamber 30 formed in the inside of the separate combustion chamber wall element 80 is connected to the second annular combustion chamber 36 through outflow openings 48. Further component parts of the inflator 10 are provided analogously to the embodiment shown in FIG. 1.

The invention claimed is:

1. An inflator (10) comprising an outer housing which has at least two housing parts (12; 12') connected to each other in the form of a diffuser bowl (14; 14') with outflow openings (16; 16') towards the outside and a cover (20; 20') directly connected to the diffuser bowl (14; 14'), wherein inside the inflator (10) at least a first and a second combustion chamber (30, 36; 36') are provided and wherein the first combustion chamber (30) is confined by an inner wall (32; 32') and the second combustion chamber (36; 36') is located within the space confined by the diffuser bowl (14; 14') and the cover (20; 20'), wherein the diffuser bowl (14; 14') and/or the cover (20; 20') comprise a section (24; 24') that is shaped into an indentation forming at least partially a circumferential section of the inner wall (32; 32') that defines the first combustion chamber (30), the section (24; 24') being closed by a closing member (26; 26') that further defines the first combustion chamber (30) and comprises one or more outflow openings (50).

2. The inflator according to claim 1, wherein the first combustion chamber (30) is surrounded by the second combustion chamber (36; 36') at least in sections at least in the area of the circumferential wall of the first combustion chamber (30).

3. The inflator according to claim 1, wherein the housing parts (12; 12') are shaped so that they are connected to each other along an outer closed curve (22; 22') and along an inner closed curve (34; 34'), wherein the second combustion chamber (36; 36') is formed between the outer and inner closed curves (22, 34; 22', 34').

4. The inflator according to claim 3, wherein at least one of the curves (22, 34; 22', 34') have a circular shape.

5. The inflator according to claim 3, wherein the inner wall (32; 32') is mounted directly to a bottom of the opposite housing part at the inner curve (34; 34').

6. The inflator according to claim 3, wherein the housing parts (12; 12') are interconnected by welding, the welds being located on the curves (22, 34; 22', 34').

7. The inflator according to claim 3, wherein the diffuser bowl (14; 14') has outflow openings (16; 16') for at least the second combustion chamber (36; 36').

8. The inflator according to claim 1, wherein the inner wall (32; 32') is mounted directly to the bottom of an opposite housing part (12; 12').

9. The inflator according to claim 1, wherein the inner wall (32) is constituted by the shaped diffuser bowl (14).

10. The inflator according to claim 1, wherein the closing member (26; 26') forms a third housing part (12; 12').

11. The inflator according to claim 1, wherein the one or more outflow openings (50) are directed towards the outer area and/or the inner area of the inflator (10).

12. The inflator according to claim 11, wherein the housing part (12, 12') provided with the indentation includes a bottom outside the indentation and the closing member (26, 26') is adjacent to the bottom and/or the outflow opening (50) is located in the closing member (26) substantially level with the bottom.

13. The inflator according to claim 1, wherein respective separate outflow openings (50, 16) are associated with the first and second combustion chambers (30, 36).

14. The inflator according to claim 13, wherein the outer housing has an axial central axis (66) and the outflow openings (50) of the first combustion chamber (30) are located more closely to the central axis (66) by at least the factor 2 than the second combustion chamber (36).

15. The inflator according to claim 1, wherein the outer housing has an axial central axis (66) and the first combustion chamber (30) is arranged symmetrically with respect to the central axis (66).

16. The inflator according to claim 1, wherein the cover (20; 20') is bowl-shaped.

17. The inflator according to claim 1, wherein the housing part (12; 12') provided with the indentation is bowl-shaped and the indentation extends into the interior of the bowl.

18. The inflator according to claim 1, wherein an igniting device (42') associated with the second combustion chamber (36') is arranged in a separated area (76) of the first combustion chamber.

19. The inflator according to claim 1, wherein the first combustion chamber (30) is divided into two areas (76) independent of each other, wherein separate outflow openings (48'; 82) are associated with each area (76).

20. The inflator, according to claim 1, wherein all outflow openings (50) of the first combustion chamber (30) are arranged in the outer housing such that they are located on one side of a first plane (72) including an axial central axis (66) of the outer housing.

21. The inflator according to claim 20, wherein the outflow openings (50) arranged in the outer housing of the first combustion chamber (30) are located in a sector which is formed by the first plane (72) and a further second plane (74) including the axial central axis (66), the sector having an angle of less than or equal to 90°.

22. The inflator according to claim 20, wherein outflow openings (16) of the second combustion chamber (36) are arranged on a third plane (68) located substantially perpendicularly to the axial central axis (66).

23. The inflator according to claim 22, wherein the outflow openings (50) of the first combustion chamber (30) are arranged on a fourth plane (64) which is disposed substantially in parallel to the third plane (68) comprising the outflow openings (16) of the second combustion chamber (36).

24. The inflator according to claim 23, wherein the distance between the third plane and the fourth plane (68, 64) is between 11 and 21 mm.

25. A module comprising an inflator, an airbag inflatable by the inflator (10) and a mounting means for attaching the module, especially in the interior of a vehicle, wherein the inflator (10) is formed in accordance with claim 1.

26. The inflator according to claim 1, further comprising an igniting device (38; 38') located at an end of the combustion chamber (30; 30') opposite the closing member (26; 26').

27. An inflator (10) comprising an outer housing which has at least two housing parts (12; 12') connected to each other in the form of a diffuser bowl (14; 14') with outflow openings (16; 16') towards the outside and a cover (20; 20') directly connected to the diffuser bowl (14; 14'), wherein inside the inflator (10) at least a first and a second combustion chamber (30, 36; 36') are provided and wherein the first combustion chamber (30) is confined by an inner wall (32; 32') and the second combustion chamber (36; 36') is located within the space confined by the diffuser bowl (14; 14') and the cover (20; 20'), wherein the diffuser bowl (14; 14') and/or the cover (20; 20') comprise a section (24; 24') that is shaped into an indentation forming at least partially a circumferential section of the inner wall (32; 32'), wherein the outer housing has an axial central axis (66) and the first combustion chamber (30) is arranged eccentrically with respect to the central axis (66).

28. An inflator (10) comprising an outer housing which has at least two housing parts (12; 12') connected to each other in the form of a diffuser bowl (14; 14') with outflow openings (16; 16') towards the outside and a cover (20; 20') directly connected to the diffuser bowl (14; 14'), wherein inside the inflator (10) at least a first and a second combustion chamber (30, 36; 36') are provided and wherein respective separate igniting devices (38, 42; 38', 42') are associated with the at least two combustion chambers (30, 36; 36'), the housing parts (12; 12') are connected along a circumferential line and the diffuser bowl (14; 14') and the cover (20; 20') separate the two combustion chambers (30, 36; 36') from each other by at least one joint contact area spaced apart from the circumferential line.

29. An inflator, comprising:
a diffuser bowl with outflow openings directed away from an interior of the inflator, the diffuser bowl including an outer surface presented outside the inflator and an opposite inner surface;
a cover directly connected to the diffuser bowl;
a closing member directly connected to the outer surface of the diffuser bowl, the outer surface of the diffuser bowl and the closing member defining a first combustion chamber, the inner surface of the diffuser bowl and the cover defining a second combustion chamber; and
a first ignition device associated with the first combustion chamber and a second ignition device associated with the second combustion chamber, wherein the first and second ignition devices are mounted in respective openings in at least one of the diffuser bowl and cover.

* * * * *